United States Patent
Rosenbaum et al.

(10) Patent No.: US 10,284,546 B2
(45) Date of Patent: May 7, 2019

(54) CLIENT DEVICE AND SERVER DEVICE FOR THE SECURED ACTIVATION OF FUNCTIONS OF A CLIENT

(71) Applicant: SIEMENS AKTIENGESELLSCHAFT, München (DE)

(72) Inventors: Ute Rosenbaum, Kempten (DE); Marcus Schafheutle, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 144 days.

(21) Appl. No.: 15/168,698

(22) Filed: May 31, 2016

(65) Prior Publication Data
US 2016/0359634 A1 Dec. 8, 2016

(30) Foreign Application Priority Data
Jun. 3, 2015 (DE) .................. 10 2015 210 294

(51) Int. Cl.
*H04L 29/06* (2006.01)
*H04L 9/14* (2006.01)
*H04L 9/08* (2006.01)

(52) U.S. Cl.
CPC .......... *H04L 63/083* (2013.01); *H04L 9/0825* (2013.01); *H04L 9/0894* (2013.01); *H04L 9/14* (2013.01)

(58) Field of Classification Search
CPC ... H04L 63/083; H04L 9/0825; H04L 9/0894; H04L 9/14
USPC ........................................................ 713/176
See application file for complete search history.

(56) References Cited

U.S. PATENT DOCUMENTS

| | | | | |
|---|---|---|---|---|
| 5,652,793 A | * | 7/1997 | Priem | G06F 21/10 340/5.74 |
| 6,819,133 B1 | * | 11/2004 | Kliesner | G11C 7/24 326/38 |
| 8,839,451 B1 | * | 9/2014 | Lam | G06F 21/10 713/193 |
| 9,122,878 B1 | * | 9/2015 | Curry | G06F 21/121 |
| 9,560,041 B2 | * | 1/2017 | Priebatsch | G06F 21/31 |

(Continued)

FOREIGN PATENT DOCUMENTS

| | | |
|---|---|---|
| CN | 1485746 A | 3/2004 |
| CN | 101415182 A | 4/2009 |
| CN | 103906054 A | 7/2014 |

OTHER PUBLICATIONS

Non-English Chinese Office Action for Application No. 2018112902111020, dated Dec. 4, 2018.

*Primary Examiner* — Matthew T Henning
(74) *Attorney, Agent, or Firm* — Schmeiser, Olsen & Watts LLP.

(57) ABSTRACT

A client device for the secured activation of functions of a client, a server device for providing a password for the client device, and corresponding methods. The client device has a storage unit for storing a plurality of service keys, each service key defining at least one function of the client and being allocated to a password, a receiving unit for receiving a password from a server, and a processing unit for comparing the plurality of service keys with the received password, for selecting the service key to which the received password is allocated, and for activating at least one function of the client which is contained in the selected service key.

17 Claims, 1 Drawing Sheet

(56) References Cited

U.S. PATENT DOCUMENTS

| | | | |
|---|---|---|---|
| 2004/0252186 A1 | 12/2004 | Mashitani et al. | |
| 2005/0055309 A1* | 3/2005 | Williams | G06Q 20/102 705/40 |
| 2005/0108707 A1* | 5/2005 | Taylor | G06Q 30/02 717/177 |
| 2005/0231369 A1* | 10/2005 | Friedrich | G06F 21/31 340/572.1 |
| 2006/0009217 A1* | 1/2006 | Lunden | H04M 1/72525 455/435.1 |
| 2006/0130004 A1* | 6/2006 | Hughes | G06F 9/44584 717/131 |
| 2008/0118059 A1* | 5/2008 | Shenfield | H04W 12/06 380/44 |
| 2009/0061839 A1* | 3/2009 | Zimmerman | H04W 8/265 455/419 |
| 2011/0202983 A1* | 8/2011 | Pope | G06F 21/572 726/7 |
| 2012/0297187 A1* | 11/2012 | Paya | H04L 63/0492 713/156 |
| 2013/0283387 A1* | 10/2013 | Wang | G06F 21/6209 726/26 |
| 2014/0129341 A1* | 5/2014 | Bobrovsky | G06Q 30/02 705/14.64 |
| 2014/0325042 A1* | 10/2014 | Croy | H04L 41/082 709/221 |
| 2015/0178100 A1* | 6/2015 | Chinnapathlolla | G06F 9/44505 713/100 |

\* cited by examiner

CLIENT DEVICE AND SERVER DEVICE FOR THE SECURED ACTIVATION OF FUNCTIONS OF A CLIENT

CROSS-REFERENCE TO RELATED APPLICATIONS

This application claims priority to German application No. DE 102015210294.7, having a filing date of Jun. 3, 2015, the entire contents of which are hereby incorporated by reference.

FIELD OF TECHNOLOGY

The following relates to a client device for the secured activation of functions of a client. Furthermore, embodiments of the invention relate to a server device for providing a password for a client device. In addition, embodiments of the invention relate to a system comprising a client which has a client device, and to a server which has a server device. Furthermore, embodiments of the invention relate to a method for the secured activation of functions of a client. In addition, embodiments of the invention relate to a method for providing a password for a client device.

BACKGROUND

Present-day products offer complex service and maintenance functions by means of which device parameters can be changed and errors diagnosed or eliminated. Utilization of such functions can assume a high level of training in maintenance technicians. These products are frequently devices which must meet product safety requirements. It is of importance especially in this context to be able to ensure that maintenance work or service performances can only be carried out by users who have a corresponding training or corresponding knowledge. Otherwise, the performance of maintenance and service functions could lead to considerable safety problems. One example for such products is medical products.

Service functions on a particular device or product must, therefore, be protected and secured in such a manner that the manufacturer can be sure that they can only be used by users authorized by the manufacturer and trained to an up-to-date level. Furthermore, it is also an important business model to enable service and maintenance tasks to be performed temporarily on a device for a reward. It is, therefore, desirable to ensure that the acquired maintenance achievement can only be performed on the specific device and not on other devices of the same type and/or the acquired maintenance achievement can be performed only within the agreed period of time and/or the credential of the acquired maintenance achievement can only be issued by the manufacturer himself.

The authorization can be produced, for example, by the manufacturer of the devices. For example, the operator of the devices can only be authorized by the manufacturer if he meets the corresponding criteria. Depending on the quality of the functions, various authorizations must be checked. An authorization limited in time would be desirable in order to be able to assume the respective up-to-date level of training of the maintenance technician. Authorization can be understood to mean data which define what can be done for how long on the device.

In order to be able to provide a possible authorization limited in time, it must be issued newly time and again by the manufacturer of the products. A permanent on-line link of the product with the manufacturer leads to increased costs, however, and increased computing capacities required. Furthermore, not all devices meet the corresponding conditions in order to be able to accept, and process complicated authorization information items.

SUMMARY

Against this background, An aspect relates to providing a simple and reliable possibility of releasing authorizations or functions of a product.

Accordingly, a client device for the secured activation of functions of a client is proposed. The client device has a storage unit for storing a plurality of service keys, each service key defining at least one function of the client and being allocated to a password, a receiving unit for receiving a password from a server and a processing unit for comparing the plurality of service keys with the received password, for selecting the service key to which the received password is allocated, and for activating at least one function of the client which is contained in the selected service key.

According to the proposed client device, service keys are generated and output by a server device, for example of the manufacturer, wherein a service key can also be designated as credential.

According to the proposed client device, a plurality of service keys is stored in advance in a client, for example a product or device. This can be done, for example, during the production or before the sale. These service keys in each case define various functions of the client which are to be activated by this service key. Function of the client can also be understood to be a number of various functions of the client.

To each of these service keys, a password is allocated, the password not being stored openly on the client device itself. Following a request, a password can now be received from a server and this password entered into the client device.

The processing unit can now compare the plurality of stored service keys with the received password. In doing so, the processing unit selects the service key to which the received password is allocated and uses this service key to activate at least one function of the client which is contained in the service key.

The respective unit, for example processing unit or receiving unit, can be implemented in hardware and/or also in software. In the case of a hardware implementation, the respective unit can be designed as device or else part of a device, for example as computer or as microprocessor or as control computer of a vehicle. In the case of a software implementation, the respective unit can be designed as computer program product, as a function, as a routine, as part of a program code or as an executable object.

According to one embodiment, the password consists of a short sequence of characters.

The password can thus have an acceptable size so that a technician can type it directly at a device or client, respectively. In this manner, the proposed client device can also be used for devices or clients which only allow an input via a keyboard. In this case, the user can achieve an activation by inputting a brief password. At the same time, this is very secure, i.e. no hacker is able to generate service keys or passwords by himself.

In contrast to the service key, or in contrast to generally digitally signed authorization data, respectively, the password, according to this embodiment, can be coded as a relatively short base 32 sequence of characters (e.g. <20 characters) so that it can be typed in by a person directly at a device. Correspondingly coded digitally signed authorization data would be much too long considering the number of characters and could, therefore, not be expected to be input manually by the person.

According to one embodiment, each service key is signed with a private key of the server.

According to this embodiment, the data used for the authorization, that is to say the service key, is signed with a digital signature process. Such a signature process can be, for example, ECDSA or RSA. The service key can thus consist of a combination of the authorization data, that is to say the data which specify which functions are to be activated, and the associated signature.

According to a further embodiment, the processing unit is configured to verify the signature of the selected service key by means of a stored public key of the server.

The private key of the manufacturer or of the server, respectively, remains with the server and the public signature key is stored in the client. In this context, a hacker cannot infer the private key from the public key. Therefore, it is also only the manufacturer who can generate service keys. Using this public key, the client device can now verify whether the received password fits one of the service keys or not.

In particular, the password is signed by means of the private key of the server within the service key together with the authorization data, that is to say the data which specify the functions of the client to be activated. The service key thus consists of the authorization data and the generated signature, but not of the password included. This is only known to the server and is not transmitted to the client device or the client, respectively.

During the verification of the selected service key, the processing unit checks whether the password received fits one of the prestored service keys at all. This means that for each stored service key, the signature is checked via the associated authorization data and the password input. In this process, the authorization data or parts thereof can be sent in advance by the client device to the server in order to request the password.

Thus, the service key contains information by means of which the device or the client device, respectively, can check whether the service key has really been issued by the manufacturer.

According to a further embodiment, the service key defines a period of an activation of the at least one function.

In the service key, a service period, that is to say any period of the validity of the service key, can already be stored. The client device can specify when requesting a password, for which period it needs a service key. The password received can then be allocated already to a service key which defines this period or a period which approaches the desired period closest.

According to a further embodiment, the processing unit is configured to deactivate the selected service key after expiry of the period of activation.

According to this embodiment, the service key selected and used is automatically deactivated after the period of activation has elapsed. In this manner, the service key used cannot be used again. Alternatively, a service key can be deactivated already on initial activation for a new use.

According to a further embodiment, the client device has a transmitting unit for transmitting a service key request to the server, the service key request specifying at least one function of the client for activation.

In order to obtain a password from the server, the transmitting unit can transmit a service key request to the server. This service key request can then define for which functions, that is to say for which service level, an activation is needed.

The service keys can be sold in the form of passwords via a business unit, for example the manufacturer, to persons or companies externally to the manufacturer which would like to perform the service and maintenance for a device of the manufacturer. This could be the owners of the devices directly or subcontractors which take over service and maintenance for the owners.

According to a further embodiment, the service key request specifies a period of activation and/or an identifier of the client.

The service key request can define how long the desired activation is to take, for example by means of a validity period or of a starting date, and can also specify an identifier of the client themselves.

According to a further embodiment, each stored service key contains a period of activation and/or an identifier of the client.

The plurality of stored service keys can be provided for different service periods or periods of activation, respectively. So that the number of stored service keys does not become too large, it is possible to work with fixed periods for the period of activation. Thus, each service key can be valid for one year, for example. Alternatively, the stored service keys can contain a different period of activation and if no suitable service key is provided, a service key can be selected which comes closest to the desired period.

According to a further embodiment, the processing unit is configured to check the selected service key with respect to the period of activation and/or the identifier of the client which are specified in the service key request.

In order to increase security, the processing unit can check the identifier of the client or device. Furthermore, the processing unit, by checking the period of activation in the selected service keys, can select the service key which comes closest to the desired period.

According to a further aspect, a server device for providing a password for a client device as is described above is proposed. The server device has a storage unit for storing a plurality of service keys, each service key defining at least one function of the client and being allocated to a password, a receiving unit for receiving a service key request, the service key request specifying at least one function of the client for activation, a processing unit for selecting a service key from the plurality of service keys based on the received service key request, and a transmitting unit for transmitting a password which is allocated to the selected service key, to the client.

The password necessary for using a service key, that is to say the password which was previously generated for this special service key, must be restorable at the server from the associated authorization data, that is to say the data which are contained in the service key request. To keep the expenditure for storage and administration of the password low, these passwords can be formed deterministically with a so-called key derivation function from the authorization data, together with a special cryptographic key.

Since this calculation would only take place in the server, it is not worrying with regard to security, either. With this approach, a hacker would not have an opportunity to generate his own service keys since he does not have access to the private signature key which is stored in the server. A pool of stored service keys in the client could not be used by a hacker for his purposes since he does not know the passwords necessary for activating the service keys. These had been selected randomly in the server or by a secret key derivation function and a hacker could then only try all possible passwords for the stored service keys by brute-force attack.

If the passwords are selected to be sufficiently long, this is associated with considerable expenditure, however. For example, a password with 100 bits can be base 32-coded in a character string with about 20 characters. A brute-force attack on the stored service keys with 100-bit passwords cannot be performed within justifiable time.

Since in the course of time, more and more stored service keys become inactive due to usage or unusable due to expiry of the validity period, the pool of stored service keys must be filled up. This can be done by the server device, for example as part of recurring system updates of the client or of the client device, respectively.

According to a further aspect, a system comprising a client which has a client device as described above, and a server which has a server device as is described above is proposed, the client and the server being configured to communicate with one another.

The client and the server can also communicate with one another implicitly, for example in that a password which is provided by the server is input into the client via a keyboard. System updates of the client which are provided by the server can also be understood to be communication. This means that a communication between client and server can also take place indirectly. Alternatively, a communication between client and server can also take place via a communication network such as, for example, WLAN or the like.

According to a further aspect, a method for the secured activation of functions of a client is proposed. The method has the following steps: storing a plurality of service keys, each service key defining at least one function of the client and being allocated to a password, receiving a password from a server, and comparing the plurality of service keys with the received password, selecting the service key to which the received password is allocated, and activating at least one function of the client which is contained in the selected service key.

According to a further aspect, a method for providing a password for a client device is proposed. The method has the following steps: storing a plurality of service keys, each service key defining at least one function of the client and being allocated to a password, receiving a service key request, the service key request specifying at least one function of the client for activation, selecting a service key from the plurality of service keys based on the received service key request, and transmitting a password which is allocated to the selected service key, to the client.

The embodiments and features described for the proposed devices apply correspondingly to the proposed methods.

Furthermore, a computer program product is proposed which causes the methods described as above to be performed on a program-controlled device.

A computer program product such as, e.g., a computer program means can be provided or supplied, for example, as storage medium such as, e.g., memory card, USB stick, CD-ROM, DVD, or also in the form of a downloadable file by a server in a network. This can take place, for example, in a wireless communication network by transmitting a corresponding file with the computer program product or the computer program means.

Further possible implementations of embodiments of the invention also comprise combinations, not mentioned explicitly, of features or embodiments described previously or in the text which follows with respect to the exemplary embodiments. In this context, the expert will also add individual aspects as improvements or supplements to the respective basic form of embodiments of the invention.

BRIEF DESCRIPTION

Some of the embodiments will be described in detail, with reference to the following figures, wherein like designations denote like members, wherein"

DETAILED DESCRIPTION

In the figures, identical or functionally identical elements have been provided with the same reference symbols unless otherwise specified.

Figure 1:
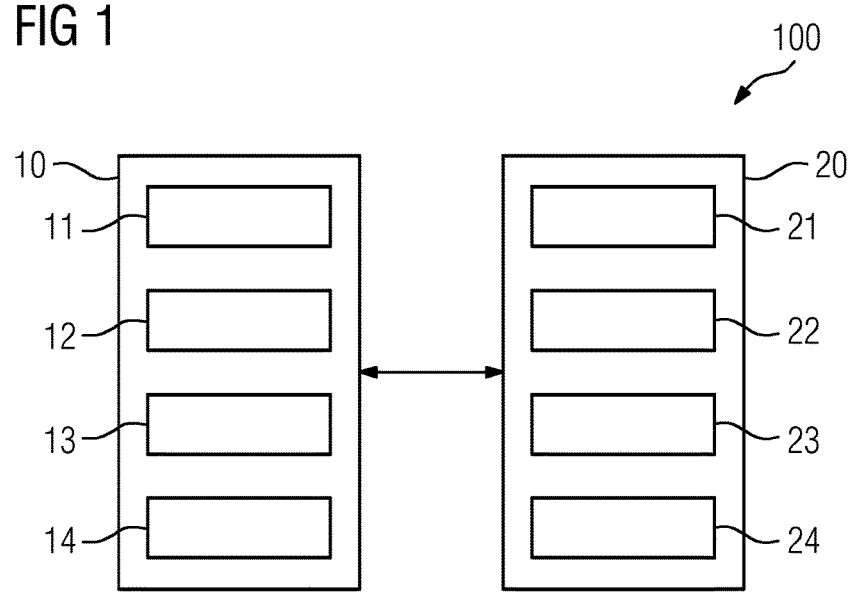
FIG. 1 shows a schematic block diagram of a system comprising a client device and a server device.

FIG. 1 shows a system 100 comprising a client which has a client device 10 and a server which has a server device 20. The client or server, respectively, are not shown here explicitly.

The client device 10 has a storage or storage unit 11, a receiver or receiving unit 12, a processor or processing unit 13 and a transmitter or transmitting unit 14.

The server device 20 has a storage or storage unit 21, a receiver or receiving unit 22, a processor or processing unit 23 and a transmitter or transmitting unit 24.

To activate functions of the client, the client device 10 can transmit a service key request to the server device 20 by means of the transmitting unit 14. This service key request can define a function of the client for activation, a period of the activation and/or an identifier of the client. The service key request is received by the receiving unit 22 of the server device 20. The processing unit 23 of the server device 20 can then select a service key from a plurality of service keys which are stored in the storage unit 21 of the server device 20. For this purpose, the processing unit 23 can check which functions of the stored service keys correspond closest to the received service key request.

The transmitting unit 24 of the server device 20 can then transmit a password, which is allocated to the selected service key, to the client device 10. In this context, transmitting can also be understood as implicit transmitting, for example as conveying the password to another device and manual inputting of the password into the client device 10.

The receiving unit 12 of the client device 10 then receives the password (at least implicitly) from the server device 20. The processing unit 13 of the client device 10 can then compare a plurality of stored service keys, which are stored in the storage unit 11 of the client device 10, with the received password.

In this context, comparing can correspond to checking the signature of the stored service keys with a generated signature by means of the password and the desired functions which are contained in the service key request. The processing unit 13 of the client device 10 can then select the corresponding service key and activate at least one function of the client which is contained in the selected service key.

Thus, the service key can have the following form:

$$Auth+\|SIGN(Auth+\|Auth-\|PWD)$$

In this context, the following notation is used:

A‖B is the concatenation of character strings A and B.

SIGN(A) is the digital signature of character string A with the private signature key p VERIFY(A, B) checks signature B via the input data A with the public signature key q. In the case of a correct signature, OK is returned, otherwise ERROR.

Auth+ are the authentication data which flow into the signature and which are part of the service key such as, for example, the service period.

Auth− are the authentication data which also flow into the signature but are not part of the service key. These data can be queried directly in the product and do not need to be sent along as part of the service key request: an example of this is the identifier of the client.

PWD is a randomly generated password.

The plurality of n stored service keys can have the following form:

$$\text{Auth}_i + \text{SIGN}(\text{Auth}_i + \|\text{Auth}-\|\text{PWD}_i) \text{ for } i=1 \ldots n$$

For each service key installed and active, the signature can be checked in the processing unit 13 via the associated authorization data and via the password input: for i=1 ... n, it is checked whether $$\text{VERIFY}(\text{Auth}_i+\|\text{Auth}-\|\text{PWD}, \text{SIGN}(\text{Auth}_i+\|\text{Auth}-\|\text{PWD}_i))==\text{OK}$$

Figure 2:
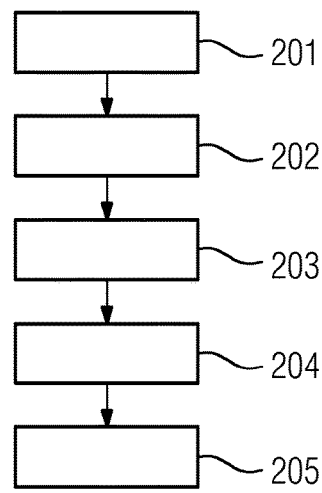
FIG. 2 shows a schematic flowchart of a method for activating functions of a client.

FIG. 2 shows a method for the secured activation of functions of a client. The method has the steps 201-205.

In step 201, a plurality of service keys is stored, each service key defining at least one function of the client and being allocated to a password.

In step 202, a password is received from a server.

In step 203, the plurality of service keys is compared with the received password.

In step 204, the service key to which the received password is allocated is selected.

In step 205, at least one function of the client which is contained in the selected service key is activated.

Figure 3:
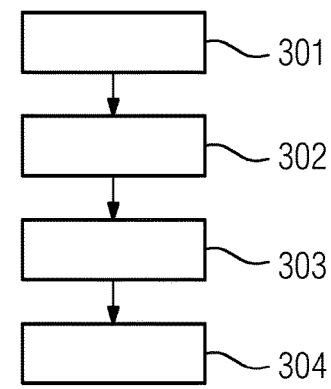
FIG. 3 shows a schematic flowchart of a method for providing a password for a client device.

FIG. 3 shows a method for providing a password for a client device 10. The method has the steps 301-304.

In step 301, a plurality of service keys is stored, each service key defining at least one function of the client and being allocated to a password.

In step 302, a service key request is received, the service key request specifying at least one function of the client for activation.

In step 303, a service key is selected from the plurality of service keys on the basis of the received service key request.

In step 304, a password, which is allocated to the selected service key, is sent to the client.

Although the present invention has been described by means of exemplary embodiments, it can be modified in many ways.

The invention claimed is:

1. A client device for the secured activation of functions of a client, comprising:
   a hardware storage for storing a plurality of service keys, wherein each service key is stored in the hardware storage during production of the client device, wherein each service key defines at least one function of the client, wherein each service key includes authorization data, and wherein each service key is allocated to a password, wherein the password is formed deterministically with a key derivation function from the authorization data,
   a receiver for receiving said password from a server, and
   a processor for comparing the plurality of service keys with the received password, for selecting the service key to which the received password is allocated, and for activating the at least one function of the client.

2. The client device as claimed in claim 1, wherein the password consists of a sequence of less than 20 characters.

3. The client device as claimed in claim 1, wherein each service key is signed with a private key of the server.

4. The client device as claimed in claim 3, wherein the processor is configured to verify the signature of the selected service key by means of a stored public key of the server.

5. The client device as claimed in claim 1, wherein the service key defines a period of an activation of the at least one function of the client.

6. The client device as claimed in claim 5, wherein the processor is configured to deactivate the selected service key after expiry of the period of activation.

7. The client device as claimed in claim 1, wherein a transmitter for transmitting a service key request to the server, the service key request specifying at least one function of the client for activation.

8. The client device as claimed in claim 7, wherein the service key request specifies at least one of a period of activation and an identifier of the client.

9. The client device as claimed in claim 7, wherein each stored service key contains at least one of a period of activation and an identifier of the client.

10. The client device as claimed in claim 9, wherein the processor is configured to check the selected service key with respect to the at least one of the period of activation and the identifier of the client which are specified in the service key request.

11. A server device for providing a password for a client device as claimed in claim 1, comprising:
    a hardware storage for storing a plurality of service keys, each service key defining at least one function of the client and being allocated to the password,
    a receiver for receiving a service key request, the service key request specifying at least one function of the client for activation,
    a processor for selecting a service key from the plurality of service keys based on the received service key request, and
    a transmitter for transmitting the password which is allocated to the selected service key, to the client.

12. A system comprising: a client which has a client device and a server which has a server device as claimed in claim 11, the client and the server being configured to communicate with one another.

13. The client device of claim 1, wherein activation of the at least one function of the client activated by the service key is required for service and maintenance of the client.

14. A method for the secured activation of functions of a client, comprising:
    storing a plurality of service keys at a client device of the client, wherein each service key is stored at the client device of the client during production of the client device, wherein each service key defines at least one function of the client, wherein each service key includes authorization data, and wherein each service key is allocated to a password,
    generating said password deterministically with a key derivation function from the authorization data,
    receiving the password from a server,
    comparing the stored plurality of service keys with the received password,
    selecting the service key to which the received password is allocated, and activating the at least one function of the client which is contained in the selected service key.

15. A computer program product comprising, wherein the hardware storage having computer readable program code stored therein, said program code executable by a processor of a computer system to implement the method as claimed in claim 14 to be performed on a program-controlled computer.

16. The method of claim 14, wherein activation of the at least one function of the client activated by the service key is required for service and maintenance of the client.

17. A method for providing a password for a client device, comprising storing a plurality of service keys at a client device of the client, wherein each service key includes authorization data and wherein each service key is allocated to a password, generating said password deterministically with a key derivation function from the authorization data, receiving a service key request, the service key request specifying at least one function of the client for activation, selecting a service key from the plurality of stored service keys based on the received service key request, and transmitting the password which is allocated to the selected service key to the client.

* * * * *